United States Patent Office 3,575,818
Patented Apr. 20, 1971

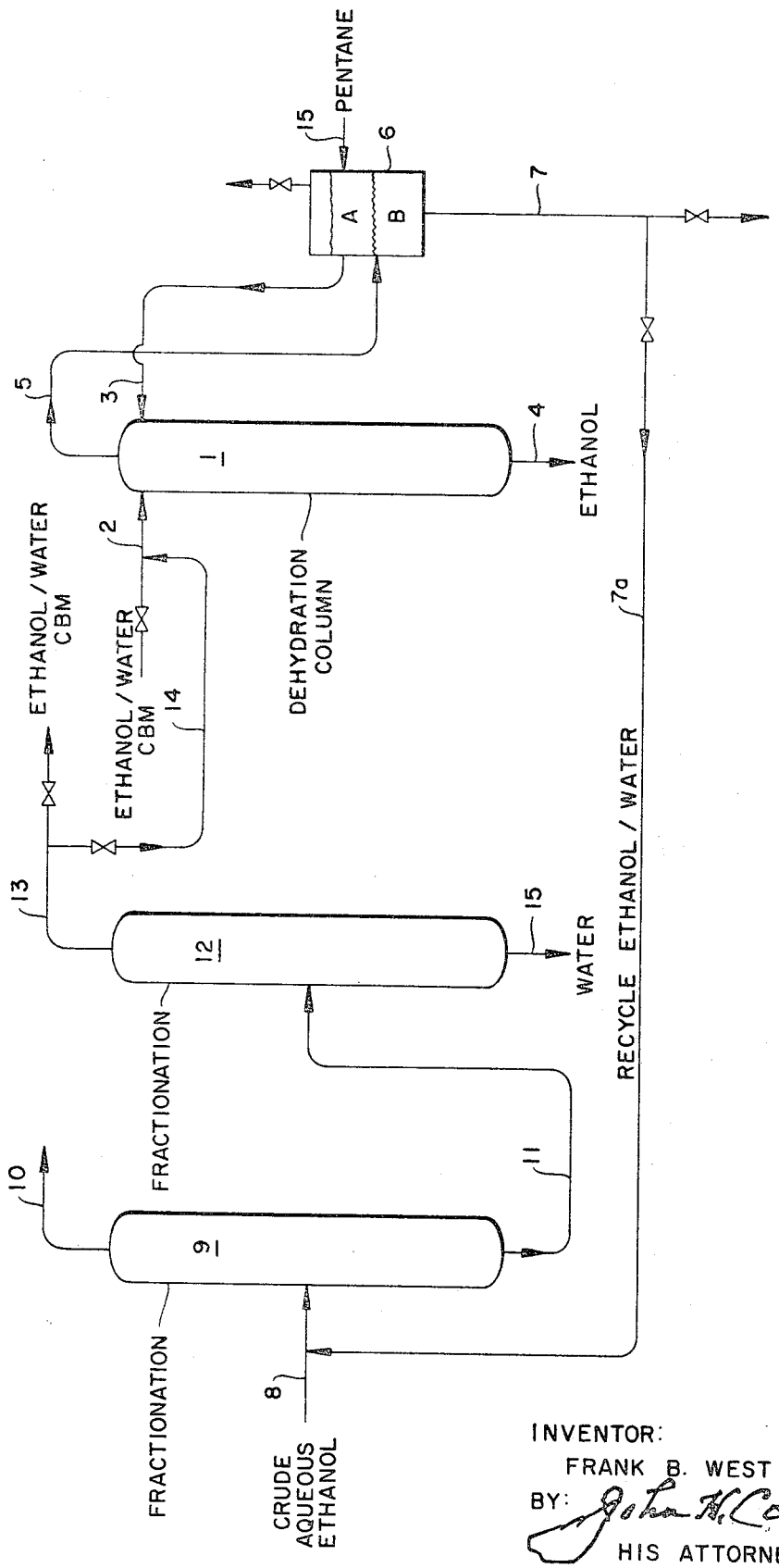

3,575,818
MANUFACTURE OF ABSOLUTE ETHANOL USING PENTANE AS AZEOTROPING AGENT
Frank B. West, Berkeley, Calif., assignor to Shell Oil Company, New York, N.Y.
Filed Feb. 3, 1969, Ser. No. 795,812
Int. Cl. C07c 29/26
U.S. Cl. 203—19
2 Claims

ABSTRACT OF THE DISCLOSURE

Ethanol-water mixtures are dehydrated by azeotropic distillation in the presence of pentane.

---

This invention relates to a method for removing water from ethanol-water solutions. The invention also relates to the production of anhydrous ethanol.

BACKGROUND OF THE INVENTION

A well-known commercial method for producing ethanol is the direct hydration of ethylene under pressure in the presence of phosphoric acid comprising catalyst. Ethanol thus produced always contains water. It is not possible to completely dehydrate ethanol by ordinary distillation processes. When an ethanol-water mixture is fractionated a constant-boiling mixture (i.e., 94% ethanol, 6% water at atmospheric pressure) is taken overhead.

The usual method of dehydrating beyond this point is to distill in the presence of an azeotroping agent which is soluble in ethanol but insoluble in water. As the distillation proceeds, the water is distilled over with the azeotroping agent and absolute ethanol remains as residue. Benzene is the most widely used ethanol dehydrating agent, although certain other materials, such as diethyl ether, carbon tetrachloride, ethyl chloride, ethyl acetate, and butyl alcohol have been proposed. Benzene effects very complete dehydration and is readily available. Unfortunately, it is very difficult to completely remove all traces of benzene from the dehydrated alcohol. This residual benzene imparts an undesirable odor to the final product. Also, a relatively large proportion of benzene must be added to the ethanol-water constant boiling mixture to complete the dehydration. Thus, since the total mixture volume is large, a large heat input and large fractionation apparatus is required.

As pointed out in U.S. Pat. 2,358,193, substitution of diethyl ether for benzene permits virtually complete removal of azeotroping agent from the bottoms product. Use of diethyl ether also allows some reduction in heat input and in apparatus size. However, use of diethyl ether requires relatively large fractionation apparatus. Its hazardous nature (auto-ignition temperature, 186° C.) is another disadvantage. Its cost is approximately three times that of benzene.

STATEMENT OF THE INVENTION

In accordance with the invention, anhydrous ethanol is obtained with substantially improved efficiency from water-ethanol mixtures by azeotropic distillation in the presence of pentane, for example, a pentane fraction, or a mixture of pentane isomers containing normal pentane as a major component. The invention will be described with reference to the attached drawing wherein the sole figure illustrates more or less diagrammatically an elevational view of one form of apparatus suitable for carrying out the invention.

It has now been found that pentane is a much more effective azeotroping agent for ethanol deyhdration (drying) than diethyl ether. Its use permits a major reduction in dehydration column size. It is also much less hazardous and expensive than benzene or diethyl ether. Its complete separation from the ethanol product is effected easily in conventional practical scale equipment.

DETAILED DESCRIPTION OF THE INVENTION

The invention is applied broadly to the dehydration of aqueous ethanol containing up to about 20% w. of water. However, it is applied with particular advantage to the dehydration of a constant boiling mixture of ethanol (94% w.) and water (6% w.). Crude ethanol produced by acid catalyzed direct hydration of ethylene generally composes about 25% w. of ethanol in water. Its water content may be reduced to for example about 6% w. by ordinary distillation means.

Although the invention will be further described with reference to the dehydration of a constant boiling mixture of ethanol and water from which at least a part of the impurities, such as for example isopropyl alcohol and diethyl ether, which were originally present have been removed, it is applied efficiently to any crude ethanol or aqueous ethanols which have been subjected to purification treatment and which contain up to about 20% w. water.

Dehydration of aqueous ethanol by azeotropic distillation, using pentane as azeotroping agent can be carried out with the aid of one or more conventional multiple stage distillation columns. The distillation stages may comprise distillation trays, Raschig rings, or other forms of column packing. The use of a column having between 10–30 theoretical distillation stages and operating at a reflux to feed ratio of from about 15 to 1 to about 7 to 1 by volume has been found satisfactory. Particularly preferred distillation conditions comprise the use of a distillation column containing from about 15 to about 20 theoretical distillation stages and operating at a reflux to feed ratio of from about 8 to 1 to about 12 to 1 by volume. Column feed is preferably introduced on or near the top distillation stage (i.e., to the upper part of the distillation column). The feed may be combined with the reflux stream to the column provides the pentane azeoreflux before introduction to the top distillation stage or the two streams may be introduced separately. The troping agent needed for the dehydration of the feed; make-up pentane being added to the reflux stream.

The azeotroping agent employed can comprise any of the saturated $C_5$ hydrocarbons, i.e., n-pentane, 2-methyl butane, 2,2-dimethyl propane, cyclopentane, and mixtures thereof. Preferably a $C_5$ hydrocarbon stream having a major proportion of n-pentane is used. Hydrocarbon streams having at least 75% w. n-pentane are especially preferred azeotroping agents.

It is generally preferred to execute the azeotropic distillation at super-atmospheric pressures. This enables higher distillation temperatures with consequent increased distillation efficiency to be used thereby carrying less ethanol overhead. Distillation column reboiler temperatures above about 90° C. are generally preferred. Temperatures of from about 105° C. to about 120° C. are especially preferred.

The overhead from the azeotropic distillation column is condensed and passed to a phase separator. Phase separation is essential to efficient operation of the process. The distillate will comprise as a major proportion thereof a hydrocarbon phase comprising pentane, which is separated by phase separation from an aqueous phase and returned to the column as reflux. The aqueous phase, comprising water and ethanol is eliminated from the azeotropic distillation step of the process.

Although the phase separation may be carried out at any temperature enabling the maintenance of liquid phase, it is generally desirable to utilize elevated temperatures. It has been found that less ethanol is taken into the aqueous phase at the higher temperatures thereby minimizing ethanol loss.

Phase separation temperatures from about 80 to about 125° C. are very effective, temperatures of from about 95 to about 110° C. being generally preferred. Pressure sufficiently high to assure the maintaining of the distillate in the liquid phase in the phase separating zone are employed.

The ethanol-water phase may be discarded. It is however generally desirable to recover its ethanol content. Recovery of the ethanol therefrom may be carried out for example by distilling a constant boiling ethanol-water mixture therefrom in a separate distillation column and recycling the ethanol-water constant boiling mixture so obtained back to the azeotropic distillation column.

The invention is further described with reference to the figure of the attached drawing. Dehydration column 1 is an azeotropic distillation column having for example about 25 theoretical distillation stages provided as trays or packing. A constant boiling mixture comprising ethanol and water (95% ethanol, 6% water) is introduced into dehydration column 1 through line 2. Reflux, comprising pentane and minor amounts of ethanol and water is introduced into column 1 through line 3. The feed stream and the reflux stream are preferably introduced at the top distillation stage. Anhydrous ethanol, containing less than 1 p.p.m. pentane, is removed from the bottom of dehydration column 1 through line 4. Overhead from column 1, comprising about 78% w. pentane, about 19% w. ethanol, and about 3% w. water, is condensed by means not shown in the drawing and passed through line 5 to phase separator 6. Within phase separator 6 the distillate is separated into a pentane-rich phase A and a water-ethanol rich phase B. The pentane-rich phase A is passed from separator 6, through line 3, into the top part of column 1 as reflux and source of the pentane azeotroping agent. Make-up pentane azeotroping agent is introduced into separator 6 in controlled amount via line 15 and combines therein with the pentane-rich phase A.

The aqueous phase B separated in separator 6 is removed therefrom through line 7 and eliminated from the system. In a preferred embodiment of the invention the ethanol content of the aqueous phase B separated in separator 6 is recovered by distillation therefrom under conditions forming a constant boiling mixture consisting essentially of ethanol and water which is then combined with the charge to the dehydration column 1.

The azeotropic distillation in accordance with the invention is advantageously carried out in combination with a distillation step comprising, for example, fractionators 9 and 12 wherein a constant boiling mixture comprising ethanol and water suitable as charge to the azeotropic distillation step is formed. Thus a crude aqueous ethanol containing about 25% w. ethanol, obtained for example by direct acid-catalyzed hydration of ethylene, is introduced into fractionator 9 through line 8. At least a part of the aqueous phase B taken from separator 6 through line 7 may be passed through line 7a into line 8 to combine therein with the crude aqueous ethanol charge to fractionator 9. In fractionator 9 light impurities, including pentane, are taken overhead and through line 10. The water-rich bottom product comprising the ethanol is introduced via line 11 into fractionator 12 wherein a constant boiling mixture comprising about 6% w. water and about 94% w. ethanol is taken off overhead through line 13. This overhead may, if desired, be subjected to further purification or sent directly to column 1 through lines 14 and 2 to be subjected to azeotropic distillation therein in the presence of added pentane. Water is removed from the system through line 5.

In an alternative embodiment of the invention, not shown, the ethanol and pentane content of the aqueous phase B, separated in separator 6, is recovered by distillation in a separate fractionator (not shown) to form an ethanol-pentane concentrate which is returned to column 1 by means not shown, with the feed or reflux.

Example 1

A constant boiling mixture of ethanol and water (i.e., 94% w. ethanol, 6% w. water) was fed to the 70th plate of an eighty-five plate two-inch diameter Oldershaw-type distillation column at a rate of 9.1 cc. per minute. This column had a measured efficiency of 0.4 theoretical distillation stages per plate. Initially, several hundred cc. of pentane was added to the upper part of the column as the azeotroping agent. Column overhead was condensed at a rate of 95.4 cc. of liquid distillate per minute. This condensate was passed to a phase separator wherein 91 cc. per minute of an upper layer comprising about 86% w. pentane, about 13% w. ethanol and about 0.6% w. water, was separated by stratification at about 25° C., and returned to the eighty-fifth plate of the column as reflux (reflux/feed ratio=10.0). A phase separator lower layer, comprising about 15% w. water, and about 70% w. ethanol and about 15% w. pentane was taken off at a rate of about 4.4 cc. per minute. Pentane was added to the system through the phase separator at a controlled rate to compensate for the loss of pentane to the aqueous phase.

Ethanol was removed continuously as bottoms from the column reboiler at about 5.4 cc. per minute. The bottoms so removed contained less than 0.1 p.p.m. of pentane, about 50 p.p.m. of water and at least 99.99% w. ethanol. The column was operated at 120 p.s.i.g. pressure, with an average reboiler temperature of 148° C. and an average reflux temperature of 25° C.

EXAMPLE II

Phase equilibrium measurements were made on a sample of column overhead similar in composition to that obtained in Example I, (i.e., about 75% w. n-pentane, about 23% w. ethanol and about 3% w. water). At 110° C., the equilibrium compositions of the upper and lower phases were:

|  | Upper phase, percent w. | Lower phase, percent w. |
| --- | --- | --- |
| n-pentane | 75.1 | 1.7 |
| Ethanol | 22.7 | 49.0 |
| Water | 2.2 | 49.3 |

Comparison of these results with those observed in the experiment of Example I shows the advantage of phase separating at elevated temperatures, i.e., at temperatures of from about 80° C. to about 125° C.

EXAMPLE III

A distillation similar to that of Example I was run for comparison using diethyl ether as azeotroping agent. The equipment and procedures of Example I were used except as follows. The number of distillation plates in the distillation column and the column reflux/feed ratio were both increased gradually until a dehydration similar to that noted with n-pentane was observed.

Feeding a constant boiling mixture of ethanol and water to the 85th plate of a 100 plate column required a reflux/feed ratio of 17/1 to lower the dehydrated ethanol water content to 70 p.p.m. when diethyl ether was used. When the column contained 120 plates and was operated with feed at plate 100 and an 11/1 reflux feed ratio the column bottoms contained about 70 p.p.m. water and about 1 p.p.m. diethyl ether. Column pressure, in both runs was 120 p.s.i.g. and the average reboiler temperature was 148° C.

I claim as my invention:

1. The process for the separation of ethanol in substantially anhydrous state from an essentially constant boiling ethanol-water mixture which comprises subjecting said ethanol-water mixture to azeotropic distillation in the presence of added pentane as azeotroping agent in an azeotropic distillation zone comprising a distillation column containing from about 10 to about 30 theoretical distillation stages being operated at superatmospheric pressure with a reboiler temperature of at least 90° C., thereby separating a liquid fraction consisting essentially of anhydrous ethanol from a vapor fraction comprising pentane, water and ethanol in said azeotropic distillation zone, separately withdrawing said vapor fraction and said liquid fraction from said azeotropic distillation zone, condensing said vapor fraction and separating the resulting liquid condensate by stratification at a temperature of from 80 to 125° C. into a supernatant hydrocarbon phase consisting essentially of pentane and ethanol and a lower aqueous phase consisting essentially of water, pentane, and ethanol, and continuously returning at least a part of said supernatant phase to the upper part of said azeotropic distillation column.

2. The process in accordance with claim 1 wherein said lower aqueous phase is distilled in a separate distillation zone, thereby forming a constant boiling water-ethanol mixture in said separate distillation zone and passing said constant boiling water-ethanol mixture from said separate distillation zone into said azeotropic distillation zone.

References Cited
UNITED STATES PATENTS

| | | | |
|---|---|---|---|
| 1,676,735 | 7/1928 | Keyes | 203—19 |
| 1,830,469 | 11/1931 | Keyes | 203—19 |
| 2,000,043 | 5/1935 | Shiffler et al. | 203—18 |
| 2,259,951 | 10/1941 | Eversole et al. | 203—17 |

WILBUR L. BASCOMB, JR., Primary Examiner

U.S. Cl. X.R.

203—70, 75, 78, 94; 260—643